though this application is a continuation-in-part of my copending application Serial No. 172,112, filed February 9, 1962, now abandoned.

United States Patent Office 3,246,052
Patented Apr. 12, 1966

3,246,052
HALOGENATED AROMATIC PHOSPHATE ESTERS
Anthony J. Guarnaccio, Niles, Ill., assignor to Universal Oil Products Company, Des Plaines, Ill., a corporation of Delaware
No Drawing. Filed Dec. 26, 1962, Ser. No. 247,353
3 Claims. (Cl. 260—951)

This application is a continuation-in-part of my copending application Serial No. 172,112, filed February 9, 1962, now abandoned.

This invention relates to new compositions of matter possessing insecticidal activity and more particularly to new compositions of matter which are prepared by condensing a halophosphate with a haloaryloxyalkyleneoxy alkanol or haloarylthioalkyleneoxy alkanol.

The use of compositions of matter which possess active insecticidal or pesticidal properties has increased in a very rapid rate during the past several years. This increase in use of new products is due in part to the fact that some insects appear to have developed a resistance to certain types of insecticides thereby rendering said insecticides impotent in controlling the growth and spread of the aforesaid insects. New and useful insecticidal compositions of matter must therefore be prepared and must exhibit new and effective insecticidal properties. Therefore, in view of this increased use, compositions of matter which possess the necessary toxic properties towards pests and insects, and which are economical to manufacture, would be commercially attractive articles of commerce.

It is therefore an object of this invention to prepare compositions of matter possessing insecticidal properties.

Another object of this invention is to provide a process for preparing new compositions of matter comprising polyhaloaryloxyalkyleneoxy phosphates or polyhaloarylthioalkyleneoxy phosphates.

Taken in its broadest aspect one embodiment of this invention resides in a process for the production of a compound having the generic formula:

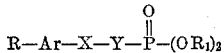

in which R is selected from the group consisting of hydrogen and alkyl radicals, Ar is a halogenated aromatic ring containing at least two halogen radicals, X is selected from the group consisting of oxygen and sulfur atoms, Y is an alkylene oxide radical containing only carbon, hydrogen and oxygen atoms, said radicals being of from 2 to about 30 carbon atoms in length and R₁ is selected from the group consisting of alkyl and aryl radicals, which comprises condensing a halophosphate with a compound selected from the group consisting of haloaryloxy alkanols, haloaryloxyalkyleneoxy alkanols, haloarylthio alkanols and haloarylthioalkyleneoxy alkanols at condensation conditions, and recovering the desired product.

Another embodiment of this invention is found in a process for the production of a compound having the generic formula:

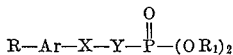

in which R is selected from the group consisting of hydrogen and alkyl radicals, Ar is a halogenated aromatic ring containing at least two halogen radicals, X is selected from the group consisting of oxygen and sulfur atoms, Y is an alkylene oxide radical containing only carbon, hydrogen and oxygen atoms, said radicals being of from 2 to about 30 carbon atoms in length and R₁ is selected from the group consisting of alkyl and aryl radicals, which comprises condensing O,O-diethyl chlorophosphate with a compound selected from the group consisting of haloaryloxy alkanols, haloaryloxyalkyleneoxy alkanols, haloarylthio alkanols and haloarylthioalkyleneoxy alkanols at a temperature in the range of from about 40° to about 200° C. and at a pressure in the range of from about atmospheric to about 100 atmospheres, and recovering the desired product.

Still another embodiment of this invention is found in a process for the production of a compound having the generic formula:

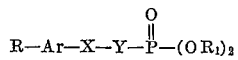

in which R is selected from the group consisting of hydrogen and alkyl radicals, Ar is a halogenated aromatic ring containing at least two halogen radicals, X is selected from the group consisting of oxygen and sulfur atoms, Y is an alkylene oxide radical containing only carbon, hydrogen and oxygen atoms, said radicals being of from 2 to about 30 carbon atoms in length and R₁ is selected from the group consisting of alkyl and aryl radicals, which comprises condensing a halophosphate with 2,4-dichlorophenoxy ethanol at a temperature in the range of from about 40° to about 200° C. and at a pressure in the range of from about atmospheric to about 100 atmospheres, and recovering the desired product.

A further embodiment of this invention is found in a compound having the generic formula:

in which R is selected from the group consisting of hydrogen and alkyl radicals, Ar is a halogenated aromatic ring containing at least two halogen radicals, X is selected from the group consisting of oxygen and sulfur atoms, Y is an alkylene oxide radical containing only carbon, hydrogen and oxygen atoms, said radicals being of from 2 to about 30 carbon atoms in length and R₁ is selected from the group consisting of alkyl and aryl radicals.

A specific embodiment of this invention resides in a process which comprises condensing O,O-diethyl chlorophosphate with 2,4-dichlorophenoxy ethanol at a temperature in the range of from about 40° to about 200° C. and at a pressure in the range of from atmospheric to about 100 atmospheres and recovering the resultant O,O-diethyl-O-(2,4-dichlorophenoxyethyl)phosphate.

Another specific embodiment of this invention is found in O,O - diethyl - O-(2,4-dichlorophenoxyethyl)phosphate.

Other objects and embodiments referring to alternative halophosphates, haloarylthio alkanols and haloaryloxy alkanols will be found in the following further detailed description of this invention.

It has now been discovered that new compositions of matter comprising haloaryloxypolyalkyleneoxy phosphate or haloarylthiopolyalkyleneoxy phosphate esters may be prepared by condensing a halophosphate containing either alkyl or aryl substituents with a haloaryloxypolyalkyleneoxy alkanol or haloarylthiopolyalkyleneoxy alkanol in the presence of an inert organic solvent and recovering the desired product. These new compositions of matter, particularly those which contain at least two and preferably more chlorine atoms on the aromatic rings, are useful as insecticides, and as intermediates in the preparation of other organic compounds. For example, the compound, O,O-di-n-butyl-O-(2,3,4,5,6 - pentachlorophenoxyethyl) phosphate which is the product of the condensation between one molecular proportion of O,O-di-n-butyl chlorophosphate and 2,3,4,5,6-pentachlorophenoxy ethanol will be an effective insecticide, especially against houseflies. The physical properties of these haloaryloxypolyalkyleneoxy phosphate esters are unique in that as the length of the polyalkyleneoxy chain increases, the molecule imparts an oil dispersant effect with water, that is, the addition of the polyalkyleneoxy groups increases the polarity of the molecule, thereby increasing the dispersant effect. It is therefore apparent that by varying the length of the polyalkyleneoxy chain of the molecule the physical properties of the compound can be adapted to a specific formulation for specific purposes. For example, as hereinbefore set forth, by increasing the length of the chain the molecule can be made more water soluble, while the use of a relatively short chain alkyleneoxy group will allow the compound to have an inherent property of being resistant to being washed off of the surface of an article after application of the compound thereon.

The compounds which are prepared according to the process of the present invention possess the generic formula:

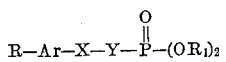

in which R is selected from the group consisting of hydrogen and alkyl radicals, said alkyl radicals containing only carbon and hydrogen atoms and being from 1 to about 5 carbon atoms or more in length, Ar is a halogenated aromatic ring containing at least two halogen atoms or radicals, said halogen atoms having an atomic weight of from about 35 to 127 (i.e., chlorine, bromine, iodine), the aromatic ring being either monocyclic or polycyclic in nature such as halogenated phenyl, naphthyl, phenanthryl, anthracyl, chrysyl ring, etc., X is selected from the group consisting of oxygen and sulfur atoms, Y is an alkylene oxide radical containing only carbon, hydrogen and oxygen atoms, said radicals being of from 2 to about 30 carbon atoms in length and $R_1$ is selected from the group consisting of alkyl and aryl radicals. The above mentioned alkylene oxide radicals may be defined as containing an aliphatic configuration either straight or branched chain in nature. In addition, the terms "alkylene oxide" or "alkyleneoxy," as used in the present specification and appended claims, will refer to both mono- and polyalkylene radicals. The compounds having the above identified structural formula may also be characterized generically as being haloaryloxyalkyleneoxy dialkyl phosphates, haloaryloxy alkyleneoxy diaryl phosphates, haloarylthioalkyleneoxy dialkyl phosphates or haloarylthioalkyleneoxy diaryl phosphates. The aforementioned compounds are prepared by condensing a halophosphate which, if so desired, may contain one or more alkyl substituents, with a compound selected from the group consisting of haloaryloxyalkyleneoxy alkanols and haloarylthioalkyleneoxy alkanols. The condensation is effected at elevated temperatures ranging from about 40° to about 200° C. or more and at pressures ranging from about atmospheric to about 100 atmospheres or more, the use of superatmospheric pressures being required when it is necessary to maintain a major portion of the reactants in the liquid phase. In the preferred embodiment of the invention the process is also effected in the presence of an inert organic solvent, examples of said solvents which may be used include paraffinic hydrocarbons such as n-pentane, n-hexane, n-heptane, cyclopentane, methylcyclopentane, cyclohexane, etc.; aromatic hydrocarbons such as benzene, toluene, m-xylene, o-xylene, p-xylene, ethylbenzene, etc. The specific temperature at which the reaction is effected may, when atmospheric pressures are used, be independent upon the reflux temperature of the particular organic solvent in which the reaction occurs. In addition, it is also contemplated within the scope of this invention that a hydrohalogen acceptor be included in the reaction mixture whereby the hydrohalide which is formed during the condensation between the aforementioned halophosphate and the particular alkanol, specific examples of both compounds being hereinafter set forth in greater detail, is removed from the activity of the reaction and does not interfere with further condensation. Examples of these hydrohalogen acceptors which may be used include sodium carbonate, potassium carbonate, lithium carbonate, etc.

Examples of halophosphates which may be used in the process of this invention possess the general formula:

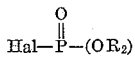

in which Hal is a halogen atom having an atomic weight between 35 and 127 (chlorine, bromine, iodine) and R is a hydrogen or alkyl radical containing only carbon and hydrogen atoms, the length of said alkyl radical being from 1 to about 5 carbon atoms in length such as chlorophosphate, bromophosphate, iodophosphate, methyl chlorophosphate, methyl bromophosphate, methyl iodophosphate, ethyl chlorophosphate, ethyl bromophosphate, ethyl iodophosphate, propyl chlorophosphate, propyl bromophosphate, propyl iodophosphate, n-butyl chlorophosphate, n-butyl bromophosphate, n-butyl iodophosphate, t-butyl chlorophosphate, t-butyl bromophosphate, t-butyl iodophosphate, pentyl chlorophosphate, pentyl bromophosphate, pentyl iodophosphate, O,O-dimethyl chlorophosphate, O,O-dimethyl bromophosphate, O,O-dimethyl iodophosphate, O,O-diethyl chlorophosphate, O,O-diethyl bromophosphate, O,O-diethyl iodophosphate, O,O-dipropyl chlorophosphate, O,O-dipropyl bromophosphate, O,O-dipropyl iodophosphate, O,O-di-n-butyl chlorophosphate, O,O-di-n-butyl bromophosphate, O,O-di-n-butyl iodophosphate, O,O-di-t-butyl chlorophosphate, O,O-di-t-butyl bromophosphate, O,O-di-t-butyl iodophosphate, etc.

Examples of haloaryloxy alkanols, haloaryloxy-alkyleneoxy alkanols, haloarylthio alkanols or haloarylthioalkyleneoxy alkanols which may be used possess the generic formulae:

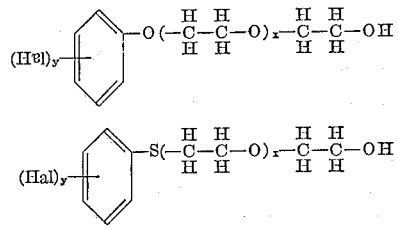

in which Hal is a halogen radical of the type hereinbefore set forth, y is an integer of from 1 to 5, and x is an integer of from 0 to about 15, said compounds including 2,4-dichlorophenoxy-O-ethanol,
2,4-dichlorophenoxy-O-ethyleneoxyethanol,
2,3,4-trichlorophenoxy-O-ethanol,
2,3,4,5-tetrachlorophenoxy-O-ethanol,
2,4-dichlorophenoxy-O-tetraoxyethylene ethanol,
2,3,4,5-tetrachlorophenoxy-O-tetraoxyethyl ethanol,
2,3,4,5,6-pentachlorophenoxy-O-ethanol,
2,4-dichlorophenoxy-O-propanol,
2,3,4-trichlorophenoxy-O-propanol,
2,3,4-trichlorophenoxy-O-tetraoxyethylene propanol,
2,3,4,5-tetrachlorophenoxy-O-propanol,
2,3,4,5,6-pentachlorophenoxy-O-propanol,
2,4-dichlorophenoxy-O-butanol,
2,4-dichlorophenoxy-O-tetraoxyethylene butanol,
2,3,4-trichlorophenoxy-O-butanol,
2,3,4-trichlorophenoxy-O-decyloxyethylene butanol,
2,3,4,5-tetrachlorophenoxy-O-butanol,
2,3,4,5,6-pentachlorophenoxy-O-butanol,
2,4-dichlorophenoxy-O-pentanol,
2,4-dichlorophenoxy-O-tetraoxyethylene pentanol,
2,3,4-trichlorophenoxy-O-pentanol,
2,3,4,5-tetrachlorophenoxy-O-pentanol,
2,3,4,5-tetrachlorophenoxy-O-decyloxyethylene pentanol,
2,3,4,5,6-pentachlorophenoxy-O-pentanol,
2,4-dichlorophenoxy-O-hexanol,
2,3,4-trichlorophenoxy-O-hexanol,
2,3,4,5-tetrachlorophenoxy-O-hexanol,
2,3,4,5-tetrachlorophenoxy-O-tetraoxyethylene hexanol, 2,3,4,5,6-pentachlorophenoxy-O-hexanol,
2,4-dichlorophenoxy-O-decanol,
2,4-dichlorophenoxy-O-tetraoxyethylene decanol,
2,3,4-trichlorophenoxy-O-decanol,
2,3,4,5-tetrachlorophenoxy-O-decanol,
2,3,4,5-tetrachlorophenoxy-O-decyloxyethylene decanol,
2,3,4,5,6-pentachlorophenoxy-O-decanol,
2,4-dibromophenoxy-O-ethanol,
2,3,4-triiodophenoxy-O-ethanol,
2,3,4,5-tetrachlorophenoxy-O-butanol,
2,3,4,5,6-pentabromophenoxy-O-hexanol,
2,4-dichlorophenylthio-S-ethanol,
2,3,4-trichlorophenylthio-S-ethanol,
2,3,4,5-tetrachlorophenylthio-S-ethanol,
2,4-dibromophenoxy-O-propanol,
2,3,4-triiodophenoxy-O-propanol,
2,3,4,5-tetrachlorophenoxy-O-propanol,
2,3,4,5,6-pentabromophenoxy-O-propanol,
2,4-dichlorophenylthio-S-propanol,
2,3,4-trichlorophenylthio-S-propanol,
2,3,4,5-tetrachlorophenylthio-S-propanol,
2,4-dibromophenoxy-O-butanol,
2,3,4-triiodophenoxy-O-butanol,
2,3,4,5-tetraiodophenoxy-O-butanol,
2,3,4,5,6-pentabromophenoxy-O-butanol,
2,4-dichlorophenylthio-S-butanol,
2,3,4-trichlorophenylthio-S-butanol,
2,3,4,5-tetrachlorophenylthio-S-butanol,
2,4-dibromophenoxy-O-decanol,
2,3,4-triiodophenoxy-O-decanol,
2,3,4,5-tetrachlorophenoxy-O-decanol,
2,3,4,5,6-pentabromophenoxy-O-decanol,
2,4-dichlorophenylthio-S-decanol,
2,3,4-trichlorophenylthio-S-decanol,
2,3,4,5-tetrachlorophenylthio-S-decanol.

It is to be understood that the aforementioned examples of halophosphates and haloaryloxyalkyleneoxy and haloarylthioalkyleneoxy phosphates are only representatives of the class of compounds which may be used in the process of the present invention and that the present invention is not necessarily limited thereto.

The physical properties of the present haloaryloxyalkyleneoxy phosphates or haloarylthioalkyleneoxy phosphates and the effects they have on entomological forms of life make them particularly desirable as insecticides and insect repellants, the compounds having many of the features desired of materials for this purpose. They are, for example, toxic to insects which are destructive of plant life and property normally subject to insect infestation, their toxic effects being manifested by contact of the poison with the insects. The insecticides comprising the present compounds are thus effective against chewing as well as sucking types of insects. The compounds are sufficiently volatile such that when applied to plant life intended for subsequent human consumption, the plant, when harvested, and after allowing a reasonable time for evaporation of the applied insecticide therefrom, retain none of the toxicant to prevent use of the plant for food purposes. On the other hand the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax; a high molecular weight alcohol or ether such as myricyl alcohol, dibutyl ether, etc.; or, by virtue of the relatively long chain polyalkyleneoxy component which renders the compound water soluble, they may be dissolved in water. The aforementioned solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred in some instances where deep penetration of the insecticide is desired, as in the treatment of fibrous material, such as wood for extinction of a particular infestation, such as wood termites. For other purposes, the required concentration of active components in the formulation may be as low as 0.1% as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as butane, Freon, etc., may be compressed and liquefied into a small bomb containing the insecticide. Upon release of pressure from the bomb, the liquefied carrier vaporizes and suspends a quantity of the active component therein, thus providing a convenient spraying method of applying insecticide. The active component may also be dissolved in a liquid carrier, such as kerosene, an alcohol, etc., and the resulting solution atomized by a suitable spraying device.

The process of this invention may be effected in any suitable manner and may comprise either a batch or continuous type operation. For example, when a batch type operation is used, a quantity of the starting materials comprising the halophosphate and the haloaryloxy alkanol, haloaryloxyalkyleneoxy alkanol, haloarylthio alkanol or haloarylthioalkyleneoxy alkanol is placed in an appropriate apparatus along with the desired substantially inert organic solvent of the type hereinbefore set forth. In addition, the hydrogen halide acceptor is added and the apparatus heated to the desired reaction temperature for a predetermined residence time. Following the completion of the residence time the reaction mixture is filtered to remove the halogen acceptor and the organic solvent is removed by conventional means such as, for example, flashing, distillation, etc. When the remainder of the reaction mixture contains a relatively short chain alkyleneoxy group, said product is recovered and subjected to fractional distillation under reduced pressure, the desired product being separated and recovered.

In addition, it is also contemplated within the scope of this invention that the present process be effected in a continuous type operation. When such a type of operation is used, the starting materials of the type hereinbefore set forth are continuously charged to a reactor which may be an unpacked vessel or coil or which may be lined with an adsorptive packing material such as firebrick, alumina, dehydrated bauxite and the like. This reactor is maintained at the proper operating conditions or temperature and pressure. If so desired, the starting materials may be charged through separate means or may be admixed prior to entry into said reactor and charged thereto in a single stream. In addition, it is also contemplated that the starting materials be added in the presence of the organic solvent which may also, in an alternative flow scheme, be added through separate means. Furthermore, the hydrogen halide acceptor may be also added through a separate line or, if so desired, be added along with one or both of the starting materials. Following the completion of the residence time the reaction effluent is withdrawn and the desired reaction product separated and recovered by conventional means such as, for example, fractional distillation under reduced pressure, fractional crystallization, etc.

Examples of compounds having the generic formula:

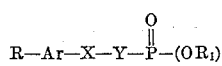

in which R is selected from the group consisting of hydrogen and alkyl radicals, Ar is a halogenated aromatic ring containing at least two halogen radicals, X is selected from the group consisting of oxygen and sulfur atoms, Y is an alkylene oxide radical containing only carbon, hydrogen and oxygen atoms, said radicals being from 2 to about 30 carbon atoms in length and $R_1$ is selected from the group consisting of alkyl and aryl radicals which may be prepared according to the process of this invention include 2,4-dichlorophenoxyethyl phosphate,
2,4-dichlorophenoxytetraethyleneoxy phosphate,
2,4-dichlorophenoxydecylethyleneoxy phosphate,
O,O-dimethyl-O-(2,4-dichlorophenoxyethyl) phosphate,
O,O-dimethyl-O-(2,4-dichlorophenoxyethoxyethyl) phosphate,
O,O-dimethyl-O-(2,4-dichlorophenoxytetraethyleneoxy) phosphate,
O,O-diethyl-O-(2,4-dichlorophenoxyethyl) phosphate,
O,O-dimethyl-O-(2,4-dichlorophenoxydecylethyleneoxy) phosphate,
O,O-diethyl-O-(2,4-dichlorophenoxyethoxyethyl) phosphate,
O,O-dipropyl-O-(2,4-dichlorophenoxyethyl) phosphate,
O,O-diethyl-O-(2,4-dichlorophenoxytetraethyleneoxy) phosphate,
O,O-di-n-butyl-O-(2,4-dichlorophenoxyethyl) phosphate,
O,O-di-n-propyl-O-(2,4-dichlorophenoxydecylethyleneoxy) phosphate,
O,O-di-t-butyl-O-(2,4-dichlorophenoxyethyl) phosphate,
O,O-di-t-butyl-O-(2,4-dichlorophenoxytetraethyleneoxy) phosphate,
O,O-dimethyl-O-(2,4-dichlorophenoxypropyl) phosphate,
O,O-diethyl-O-(2,4-dichlorophenoxypropyl) phosphate,
O,O-dipropyl-O-(2,4-dichlorophenoxypropyl) phosphate,
O,O-di-n-butyl-O-(2,4-dichlorophenoxypropyl) phosphate,
O,O-di-t-butyl-O-(2,4-dichlorophenoxypropyl) phosphate,
O,O-dimethyl-O-(2,4-dichlorophenoxybutyl) phosphate,
O,O-diethyl-O-(2,4-dichlorophenoxybutyl) phosphate,
O,O-dipropyl-O-(2,4-dichlorophenoxybutyl) phosphate,
O,O-di-n-butyl-O-(2,4-dichlorophenoxybutyl) phosphate,
O,O-di-t-butyl-O-(2,4-dichlorophenoxybutyl) phosphate,
O,O-dimethyl-O-(2,4-dichlorophenoxypentyl) phosphate,
O,O-diethyl-O-(2,4-dichlorophenoxypentyl) phosphate,
O,O-dipropyl-O-(2,4-dichlorophenoxypentyl) phosphate,
O,O-di-n-butyl-O-(2,4-dichlorophenoxypentyl) phosphate,
O,O-di-t-butyl-O-(2,4-dichlorophenoxypentyl) phosphate,
2,3,4-trichlorophenoxyethyl phosphate,
2,3,4-trichlorophenoxytetraethyleneoxy phosphate,
2,3,4-trichlorophenoxydecylethyleneoxy phosphate,
O,O-diethyl-O-(2,3,4-trichlorophenoxyethyl) phosphate,
O,O-di-n-butyl-O-(2,3,4-trichlorophenoxyethyl) phosphate,
O,O-dimethyl-O-(2,3,4-trichlorophenoxypropyl) phosphate,
O,O-dipropyl-O-(2,3,4-trichlorophenoxypropyl) phosphate,
O,O-di-t-butyl-O-(2,3,4-trichlorophenoxypropyl) phosphate,
O,O-diethyl-O-(2,3,4-trichlorophenoxybutyl) phosphate,
O,O-di-n-butyl-O-(2,3,4-trichlorophenoxybutyl) phosphate,
O,O-dimethyl-O-(2,3,4-trichlorophenoxypentyl) phosphate,
O,O-dipropyl-O-(2,3,4-trichlorophenoxypentyl) phosphate,
O,O-di-t-butyl-O-(2,3,4-trichlorophenoxypentyl) phosphate,
O,O-dimethyl-O-(2,4-dichlorophenylthioethyl) phosphate,
O,O-dimethyl-O-(2,4-dichlorophenylthioethoxyethyl) phosphate,
O,O-diethyl-O-(2,4-dichlorophenylthioethoxyethyl) phosphate,
O,O-dibutyl-O-(2,4-dichlorophenylthioethoxyethyl) phosphate,
O,O-diethyl-O-(2,4-dichlorophenylthioethyl) phosphate,
O,O-dipropyl-O-(2,4-dichlorophenylthioethyl) phosphate,
O,O-di-n-butyl-O-(2,4-dichlorophenylthioethyl) phosphate,
O,O-di-t-butyl-O-(2,4-dichlorophenylthioethyl) phosphate,
O,O-dimethyl-O-(2,4-dichlorophenylthiopropyl) phosphate,
O,O-diethyl-O-(2,4-dichlorophenylthiopropyl) phosphate,
O,O-dipropyl-O-(2,4-dichlorophenylthiopropyl) phosphate,
O,O-di-n-butyl-O-(2,4-dichlorophenylthiopropyl) phosphate,
O,O-di-t-butyl-O-(2,4-dichlorophenylthiopropyl) phosphate,
O,O-dimethyl-O-(2,4-dichlorophenylthiobutyl) phosphate,
O,O-diethyl-O-(2,4-dichlorophenylthiobutyl) phosphate,
O,O-dipropyl-O-(2,4-dichlorophenylthiobutyl) phosphate,
O,O-di-n-butyl-O-(2,4-dichlorophenylthiobutyl) phosphate,
O,O-di-t-butyl-O-(2,4-dichlorophenylthiobutyl) phosphate, etc.

It is to be understood that the aforementioned compounds are only representatives of the class of compounds which may be prepared according to the present process and that this invention is not necessarily limited thereto.

The following examples are given to illustrate the process of the present invention which, however, are not intended to limit the generally broad scope of the present invention in strict accordance therewith.

Example I

In this example a mixture of 89 grams (0.36 mole) of O,O-di-n-butyl chlorophosphate and 81 grams (0.39 mole) of 2,4-dichlorophenoxy ethanol in 250 cc. of benzene was placed in a flask and heated to a temperature of 40° C. After one hour, 27 grams of potassium carbonate which acted as a hydrogen halide acceptor was added and the resultant solution was then maintained at a temperature of 40° C. for an additional 8 hours. At the end of this time the reaction mixture was filtered and the benzene solvent was flashed off. A reaction product which comprises 166 grams was recovered and subjected to fractional distillation under reduced pressure. The bottoms from this distillation which comprises 79 grams of O,O-di-n-butyl-O-(2,4-dichlorophenoxy ethyl) phosphate was recovered and analyzed with the following results:

Calculated for $C_{16}H_{25}O_5Cl_2P$: P, 7.77; Cl, 17.8.
Found: P, 7.97; Cl, 19.4.

Example II

In this example a mixture of 66 grams (0.35 mole) of O,O-diethyl chlorophosphate and 81 grams (0.39 mole) of 2,4-dichlorophenoxy ethanol in 250 cc. of benzene is heated to a temperature of about 50° C. After one hour, 27 grams of potassium carbonate which acts as a hydrogen chloride acceptor is added and the resulting mixture maintained at this temperature for an additional period of 8 hours. At the end of this time the reaction mixture is filtered and the benzene solvent is flashed off. The remaining reaction mixture is recovered and subjected to fractional distillation under reduced pressure. From this distillation the desired product which comprises O,O-diethyl-O-(2,4-dichlorophenoxyethyl) phosphate is separated and recovered.

Example III

In this experiment a mixture of 76 grams (0.35 mole) of O,O-dipropyl chlorophosphate and 90 grams (0.39 mole) of 2,4-dichlorophenoxy propanol in 250 cc. of toluene is treated in a manner similar to that set forth above, the hydrogen chloride acceptor comprising sodium carbonate being added after the mixture has been heated for approximately one hour. At the end of the desired reaction time the mixture is filtered to remove the hydrogen halide acceptor and the remainder of the mixture is subjected to the fractional distillation under reduced pressure. The desired product comprising O,O-dipropyl-O-(2,4-dichlorophenoxypropyl) phosphate is separated and recovered.

*Examples IV*

In this example a mixture of 89 grams (0.39 mole) of O,O-di-t-butyl chlorophosphate and 81.5 grams (0.35 mole) of 2,4-dichlorophenyloxytetraoxyethylene ethanol along with 250 cc. of benzene is heated to a temperature of 50° C. After one hour 27 grams of potassium carbonate is added and the resulting mixture maintained at a temperature of about 50° C. for an additional period of 8 hours. At the end of this time the reaction mixture is filtered to remove the hydrohalogen acceptor and the filtrate benzene is flashed off from the filtrate. The remainder of the reaction mixture is treated by conventional means and the desired product comprising O,O-di-t-butyl-O - (2,4 - dichlorophenyloxytetraoxyethyleneethyl) phosphate also known as O,O - di - t - butyl-O-[2,4-dichlorophenoxytetra(ethyleneoxy)ethyl] phosphate is separated and recovered.

*Example V*

A mixture of O,O-dipropyl chlorophosphate and 2,4,6-trichlorophenoxydecyloxyethylene ethanol dissolved in a benzene solvent is heated to a temperature of about 50° C. After a period of about one hour a quantity of potassium carbonate is added and the resulting mixture is maintained at a temperature of about 50° C. for an additional period of about 8 hours. At the end of this time the reaction mixture is treated in a manner similar to that set forth in the above examples and the desired product comprising O,O-dipropyl-O-(2,4,6-trichlorophenoxydecyloxyethyleneethyl) phosphate also known as O,O-dipropyl-O-[2,4,6-trichlorophenoxydeca(ethyleneoxy)ethyl] phosphate is separated and recovered.

*Example VI*

An insecticidal composition is prepared by dissolving 1 gram of O,O-di-n-butyl-O-(2,4-dichlorophenoxyethyl) in 2 cc. of benzene using Triton X-100 as an emulsifying agent. This emulsion is added to 100 cc. of water and the resulting solution sprayed into a cage containing common houseflies. The solution will cause a 100% knock down. Similar tests with other compounds described in Examples II to V above will show similar results.

I claim as my invention:

1. A compound having the generic formula:

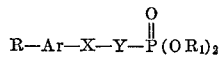

in which R is selected from the group consisting of hydrogen and lower alkyl radicals, Ar is a halogenated monocyclic aromatic ring containing at least two halogen atoms selected from the group consisting of chlorine, bromine and iodine, X is selected from the group consisting of oxygen and sulfur atoms, Y is a polyalkyleneoxy radical having only ether linkages, containing only carbon, hydrogen and oxygen atoms and containing from 2 to about 15 ethyleneoxy radicals, and $R_1$ is a lower alkyl radical.

2. O,O - di - t-butyl-O-[2,4-dichlorophenoxytetra(ethyleneoxy)ethyl] phosphate.

3. O,O - dipropyl-O-[2,4,6-trichlorophenoxydeca(ethyleneoxy)ethyl] phosphate.

References Cited by the Examiner

UNITED STATES PATENTS

| | | | |
|---|---|---|---|
| 2,411,527 | 11/1946 | Dickey et al. | 260—461 |
| 2,571,989 | 10/1951 | Schrader | 260—461 |
| 2,693,483 | 11/1954 | Tolkmith | 260—461 |
| 2,831,015 | 4/1958 | Tolkmith | 260—461 |
| 2,861,912 | 11/1958 | Sallmann | 260—461 |
| 2,891,894 | 6/1959 | Gatzi et al. | 260—461 |
| 2,892,751 | 6/1959 | Saul | 260—461 |
| 2,941,923 | 6/1960 | Albert | 260—461 |
| 2,963,505 | 12/1960 | Muhlmann et al. | 260—461 |
| 2,976,311 | 3/1961 | Schrader | 260—461 |
| 2,976,312 | 3/1961 | Schrader | 260—461 |
| 2,999,874 | 9/1961 | Schrader | 260—461 |
| 3,004,980 | 10/1961 | Schrader | 260—461 |

FOREIGN PATENTS

| | | |
|---|---|---|
| 544,659 | 2/1956 | Belgium. |
| 1,039,511 | 9/1958 | Germany. |

CHARLES B. PARKER, *Primary Examiner.*

JOSEPH P. BRUST, *Examiner.*

FRANK M. SIKORA, DELBERT R. PHILLIPS,
*Assistant Examiners.*